(12) United States Patent  (10) Patent No.: US 7,854,980 B2
Jackson et al.  (45) Date of Patent: Dec. 21, 2010

(54) FORMALDEHYDE-FREE MINERAL FIBRE INSULATION PRODUCT

(75) Inventors: Roger Jackson, Merseyside (GB); Tony Aindow, Merseyside (GB); George Baybutt, Merseyside (GB)

(73) Assignee: Knauf Insulation Limited, St. Helens, Merseyside (GB)

( * ) Notice: Subject to any disclaimer, the term of this patent is extended or adjusted under 35 U.S.C. 154(b) by 0 days.

(21) Appl. No.: 12/524,491

(22) PCT Filed: Jan. 25, 2007

(86) PCT No.: PCT/EP2007/050750

§ 371 (c)(1),
(2), (4) Date: Nov. 12, 2009

(87) PCT Pub. No.: WO2008/089851

PCT Pub. Date: Jul. 31, 2008

(65) Prior Publication Data

US 2010/0080976 A1    Apr. 1, 2010

(51) Int. Cl.
B32B 3/02 (2006.01)
(52) U.S. Cl. .................... 428/45; 428/47; 524/487
(58) Field of Classification Search ............ 428/44, 428/45, 47, 292.1; 524/487; 527/312
See application file for complete search history.

(56) References Cited

U.S. PATENT DOCUMENTS

| 1,801,052 | A | 4/1931 | Meigs |
| 1,801,053 | A | 4/1931 | Meigs |
| 1,886,353 | A | 11/1932 | Novotny et al. |
| 2,392,105 | A | 1/1946 | Sussman |
| 3,232,821 | A | 2/1966 | Moore et al. |
| 3,802,897 | A | 4/1974 | Voigt et al. |
| 3,809,664 | A | 5/1974 | Fanta |
| 3,826,767 | A | 7/1974 | Hoover et al. |
| 3,856,606 | A | 12/1974 | Fan et al. |
| 3,911,048 | A | 10/1975 | Vargiu et al. |
| 4,028,290 | A | 6/1977 | Reid |
| 4,048,127 | A | 9/1977 | Gibbons et al. |
| 4,054,713 | A | 10/1977 | Sakaguchi et al. |
| 4,097,427 | A | 6/1978 | Aitken et al. |

(Continued)

FOREIGN PATENT DOCUMENTS

EP    0 524 518    7/1992

(Continued)

OTHER PUBLICATIONS

International Search Report and Written Opinion for PCT/EP2007/050750, completed Nov. 28, 2007.

(Continued)

Primary Examiner—N. Edwards
(74) Attorney, Agent, or Firm—Barnes & Thornburg LLP

(57) ABSTRACT

A packaged mineral fibre insulating material has: a) a Recovered Thickness of at least 95% nominal thickness; and b) an Ordinary Parting Strength of at least 95 g/g; and c) a Weathered Parting Strength of at least 75 g/g the material comprising mineral fibres and an organic, formaldehyde free binder in a quantity of less than 15% by weight, preferably less than 10% by weight, said binder having been applied to the fibres of the insulating material in liquid form at pH of greater than 5.

20 Claims, 1 Drawing Sheet

U.S. PATENT DOCUMENTS

Figure 1:
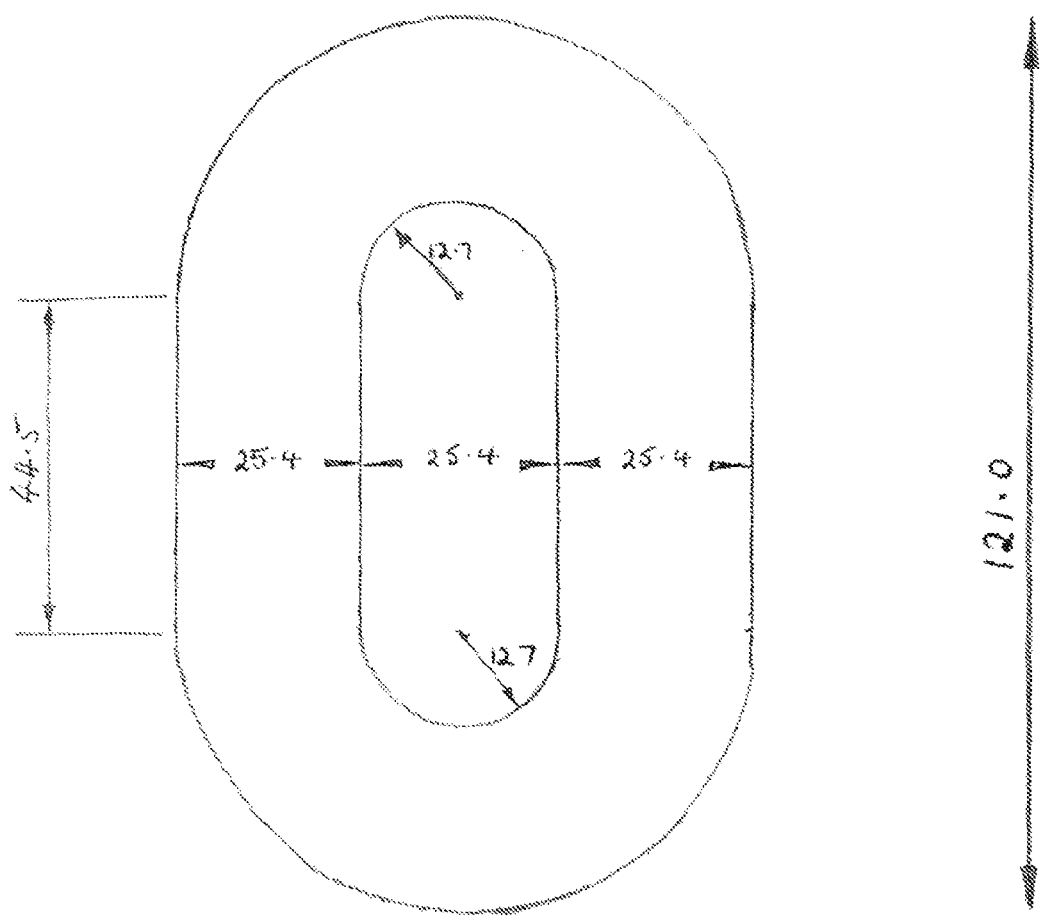

| | | | |
|---|---|---|---|
| 4,107,379 A | 8/1978 | Stofko | |
| 4,148,765 A | 4/1979 | Nelson | |
| 4,183,997 A | 1/1980 | Stofko | |
| 4,233,432 A | 11/1980 | Curtis, Jr. | |
| 4,246,367 A | 1/1981 | Curtis, Jr. | |
| 4,278,573 A | 7/1981 | Tessler | |
| 4,296,173 A | 10/1981 | Fahey | |
| 4,301,310 A | 11/1981 | Wagner | |
| 4,330,443 A | 5/1982 | Rankin | |
| 4,357,194 A | 11/1982 | Stofko | |
| 4,400,496 A | 8/1983 | Butler | |
| 4,464,523 A | 8/1984 | Neigel | |
| 4,524,164 A | 6/1985 | Viswanathan et al. | |
| 4,668,716 A | 5/1987 | Pepe et al. | |
| 4,692,478 A | 9/1987 | Viswanathan et al. | |
| 4,754,056 A | 6/1988 | Ansel et al. | |
| 4,845,162 A | 7/1989 | Schmitt et al. | |
| 4,906,237 A | 3/1990 | Johansson et al. | |
| 4,912,147 A | 3/1990 | Pfoehler et al. | |
| 4,923,980 A | 5/1990 | Blomberg | |
| 5,037,930 A | 8/1991 | Shih | |
| 5,041,595 A | 8/1991 | Yang | |
| 5,095,054 A | 3/1992 | Lay | |
| 5,106,615 A | 4/1992 | Dikstein | |
| 5,114,004 A | 5/1992 | Isono et al. | |
| 5,124,369 A | 6/1992 | Vandichel et al. | |
| 5,151,465 A | 9/1992 | Le-Khac | |
| 5,308,896 A | 5/1994 | Hansen et al. | |
| 5,318,990 A | 6/1994 | Strauss | |
| 5,336,753 A | 8/1994 | Jung et al. | |
| 5,336,755 A | 8/1994 | Pape | |
| 5,340,868 A | 8/1994 | Strauss et al. | |
| 5,371,194 A | 12/1994 | Ferretti | |
| 5,387,665 A | 2/1995 | Misawa et al. | |
| 5,393,849 A | 2/1995 | Srinivasan et al. | |
| 5,434,233 A | 7/1995 | Kiely et al. | |
| 5,480,973 A | 1/1996 | Goodlad et al. | |
| 5,498,662 A | 3/1996 | Tanaka et al. | |
| 5,536,766 A | 7/1996 | Seyffer et al. | |
| 5,547,541 A | 8/1996 | Hansen et al. | |
| 5,571,618 A | 11/1996 | Hansen et al. | |
| 5,578,678 A | 11/1996 | Hartmann | |
| 5,582,682 A | 12/1996 | Ferretti | |
| 5,583,193 A | 12/1996 | Aravindakshan et al. | |
| 5,609,727 A | 3/1997 | Hansen et al. | |
| 5,614,570 A | 3/1997 | Hansen et al. | |
| 5,620,940 A | 4/1997 | Birbara et al. | |
| 5,621,026 A | 4/1997 | Tanaka et al. | |
| 5,633,298 A | 5/1997 | Arfaei et al. | |
| 5,643,978 A | 7/1997 | Darwin et al. | |
| 5,645,756 A | 7/1997 | Dubin et al. | |
| 5,661,213 A | 8/1997 | Arkens et al. | |
| 5,691,060 A | 11/1997 | Levy | |
| 5,693,411 A | 12/1997 | Hansen et al. | |
| 5,756,580 A | 5/1998 | Natori et al. | |
| 5,855,987 A | 1/1999 | Margel et al. | |
| 5,885,337 A | 3/1999 | Nohr et al. | |
| 5,895,804 A | 4/1999 | Lee et al. | |
| 5,919,831 A | 7/1999 | Philipp | |
| 5,925,722 A | 7/1999 | Exner | |
| 5,929,184 A | 7/1999 | Holmes-Farley et al. | |
| 5,932,344 A | 8/1999 | Ikemoto et al. | |
| 5,932,665 A | 8/1999 | DePorter et al. | |
| 5,932,689 A | 8/1999 | Arkens et al. | |
| 5,942,123 A | 8/1999 | McArdle | |
| 5,977,224 A | 11/1999 | Cheung et al. | |
| 5,977,232 A | 11/1999 | Arkens | |
| 5,981,719 A | 11/1999 | Woiszwillo et al. | |
| 5,983,586 A | 11/1999 | Berdan, II et al. | |
| 5,990,216 A | 11/1999 | Cai et al. | |
| 6,067,821 A * | 5/2000 | Jackson et al. | 65/482 |
| 6,072,086 A | 6/2000 | James et al. | |
| 6,077,883 A | 6/2000 | Taylor et al. | |
| 6,090,925 A | 7/2000 | Woiszwillo et al. | |
| 6,114,033 A | 9/2000 | Ikemoto et al. | |
| 6,114,464 A | 9/2000 | Reck et al. | |
| 6,136,916 A | 10/2000 | Arkens et al. | |
| 6,171,654 B1 | 1/2001 | Salsman et al. | |
| 6,210,472 B1 | 4/2001 | Kwan et al. | |
| 6,221,973 B1 | 4/2001 | Arkens et al. | |
| 6,310,227 B1 | 10/2001 | Sarama et al. | |
| 6,313,102 B1 | 11/2001 | Colaco et al. | |
| 6,319,683 B1 | 11/2001 | James et al. | |
| 6,331,350 B1 | 12/2001 | Taylor et al. | |
| 6,379,739 B1 | 4/2002 | Formanek et al. | |
| 6,395,856 B1 | 5/2002 | Petty et al. | |
| 6,440,204 B1 | 8/2002 | Rogols et al. | |
| 6,468,442 B2 | 10/2002 | Bytnar | |
| 6,468,730 B2 | 10/2002 | Fujiwara et al. | |
| 6,482,875 B2 | 11/2002 | Lorenz et al. | |
| 6,495,656 B1 | 12/2002 | Haile et al. | |
| 6,525,009 B2 | 2/2003 | Sachdev et al. | |
| 6,638,884 B2 | 10/2003 | Quick et al. | |
| 6,753,361 B2 | 6/2004 | Kroner et al. | |
| 6,852,247 B2 | 2/2005 | Bytnar | |
| 6,858,074 B2 | 2/2005 | Anderson et al. | |
| 6,861,495 B2 | 3/2005 | Barsotti et al. | |
| 6,864,044 B2 | 3/2005 | Ishikawa et al. | |
| 6,955,844 B2 | 10/2005 | Tagge et al. | |
| 7,029,717 B1 | 4/2006 | Ojima et al. | |
| 7,067,579 B2 | 6/2006 | Taylor et al. | |
| 7,090,745 B2 | 8/2006 | Beckman | |
| 7,141,626 B2 | 11/2006 | Rodrigues et al. | |
| 7,195,792 B2 | 3/2007 | Boston et al. | |
| 7,201,778 B2 | 4/2007 | Smith et al. | |
| 7,772,347 B2 * | 8/2010 | Swift et al. | 527/312 |
| 7,807,771 B2 * | 10/2010 | Swift et al. | 527/312 |
| 2002/0032253 A1 | 3/2002 | Lorenz et al. | |
| 2002/0091185 A1 | 7/2002 | Taylor | |
| 2002/0161108 A1 | 10/2002 | Schultz et al. | |
| 2003/0005857 A1 | 1/2003 | Minami et al. | |
| 2004/0019168 A1 | 1/2004 | Soerens et al. | |
| 2004/0033747 A1 | 2/2004 | Miller et al. | |
| 2004/0038017 A1 | 2/2004 | Tutin et al. | |
| 2004/0077055 A1 | 4/2004 | Fosdick et al. | |
| 2004/0122166 A1 | 6/2004 | O'Brien-Bernini et al. | |
| 2004/0152824 A1 | 8/2004 | Dobrowolski | |
| 2004/0249066 A1 | 12/2004 | Heinzman et al. | |
| 2004/0254285 A1 | 12/2004 | Rodrigues et al. | |
| 2005/0059770 A1 | 3/2005 | Srinivasan | |
| 2005/0171085 A1 | 8/2005 | Pinto et al. | |
| 2005/0196421 A1 | 9/2005 | Hunter et al. | |
| 2005/0215153 A1 | 9/2005 | Cossement et al. | |
| 2005/0275133 A1 | 12/2005 | Cabell et al. | |
| 2006/0099870 A1 | 5/2006 | Garcia et al. | |
| 2006/0111480 A1 | 5/2006 | Hansen et al. | |
| 2006/0135433 A1 | 6/2006 | Murray et al. | |
| 2006/0252855 A1 | 11/2006 | Pisanova et al. | |
| 2007/0006390 A1 | 1/2007 | Clamen et al. | |
| 2007/0009582 A1 | 1/2007 | Madsen et al. | |
| 2007/0142596 A1 * | 6/2007 | Swift et al. | 527/312 |
| 2008/0108741 A1 | 5/2008 | Van Herwijnen | |
| 2009/0324915 A1 * | 12/2009 | Swift et al. | 428/219 |
| 2010/0080976 A1 * | 4/2010 | Jackson et al. | 428/292.1 |
| 2010/0084598 A1 * | 4/2010 | Jackson et al. | 252/62 |
| 2010/0130649 A1 * | 5/2010 | Swift et al. | 524/35 |

FOREIGN PATENT DOCUMENTS

| | | |
|---|---|---|
| EP | 0 547 819 | 6/1993 |
| EP | 0 583 086 | 2/1994 |
| EP | 0 672 720 | 9/1995 |
| EP | 0714754 B1 | 12/1995 |
| EP | 0 826 710 | 4/1998 |

| | | |
|---|---|---|
| EP | 0 873 976 | 10/1998 |
| EP | 0 882 756 | 12/1998 |
| EP | 0 911 361 | 4/1999 |
| EP | 0 990 729 | 4/2000 |
| EP | 1 038 433 | 9/2000 |
| EP | 1 193 288 | 4/2002 |
| EP | 1 382 642 | 1/2004 |
| EP | 1 486 547 | 12/2004 |
| EP | 1522642 A1 | 7/2005 |
| EP | 1741726 A1 | 7/2005 |
| EP | 1655400 A1 | 11/2005 |
| FR | 2 614 388 | 10/1988 |
| GB | 2 078 805 | 1/1982 |
| JP | 57-101100 | 6/1982 |
| JP | 2002-293576 | 9/2002 |
| JP | 2004-60058 | 2/2004 |
| SU | 374400 | 3/1973 |
| WO | WO99/27206 | 6/1999 |
| WO | 99/47765 | 9/1999 |
| WO | 00/62628 | 10/2000 |
| WO | 03/071879 | 9/2003 |
| WO | 2004/076734 | 9/2004 |
| WO | WO2006/044302 | 4/2006 |
| WO | WO2007/014236 | 2/2007 |

OTHER PUBLICATIONS

English Translation of Japanese Abstract for 58011193, Jan. 21, 1983, 1 page.

English Translation of Japanese Abstract for 03173680, Jul. 26, 1991, 1 page.

English Translation of Japanese Abstract for 07034023, Feb. 3, 1995, 1 page.

English Translation of Russian Abstract for 374400, Mar. 20, 1973, 1 page.

Ames, J. M., "The Maillard Browning Reaction—an Update", Chemistry & Industry, No. 17, 1988, 4 pages.

"Gamma-aminopropyltrimethoxysilane", Hawley's Condensed Chemical Dictionary, 14th Edition, John Wiley & Sons, Inc., 2002, 1 page.

* cited by examiner

FORMALDEHYDE-FREE MINERAL FIBRE INSULATION PRODUCT

CROSS-REFERENCE TO RELATED APPLICATIONS

This application is a U.S. national counterpart application of international application serial no. PCT/EP2007/050750 filed Jan. 25, 2007.

FIELD OF THE INVENTION

This invention relates to a mineral fibre insulating product having a low formaldehyde or formaldehyde free binder.

BACKGROUND

Industry standard binders used for fibre insulation, for example glass wool and rock wool insulation are based on phenol formaldehyde. Whilst such binders can provide suitable properties to the insulating products there has for some time been a desire to move away from the use of phenol formaldehyde, particularly due to environmental considerations.

Traditional polyester based binder systems have previously been proposed but have not gained acceptance in the insulation industry, particularly as their strength in holding the mineral fibres together, especially when exposed to moisture or weathering, has been perceived as insufficient.

To date, only one low formaldehyde based mineral insulation binder system has been used on an industrial scale on glass wool insulation; this is based on polyacrylic acid and supplied by Rohm&Haas. Unfortunately, the highly acid nature of these types of binders can cause excessive corrosion of manufacturing plant unless significant investment is made in acid resistant equipment. U.S. Pat. No. 5,977,232 discloses a formaldehyde free binder for glass wool insulation based on a polycarboxylic acid. European patent application EP1698598A discloses use of a corrosion meter to try to mitigate problems associated with polycarboxylic acid-based fibreglass binder resins. In addition, whilst the strength of these binders is acceptable for some applications it is not as good as the commonly used phenol formaldehyde based binders.

It has not been thought possible to provide a formaldehyde free binder system useable on an industrial scale that will confer required characteristics, including strength, to mineral wool insulating products without encountering the difficulties associated with highly acidic liquid binder systems.

SUMMARY

According to one aspect, the present invention provides a packaged mineral fibre insulating material as defined in claim 1. Other aspects are defined in other independent claims. Preferred and/or alternative features are defined in the dependent claims.

DETAILED DESCRIPTION

As used herein, the term formaldehyde free means that the composition is substantially free from formaldehyde, preferably does not liberate substantial formaldehyde as a result of drying or curing and/or preferably comprises less than one part per million by weight of formaldehyde.

Desired characteristics to be conferred by the binder on some mineral wool insulation product can be assessed by measuring Recovered Thickness and/or Ordinary Parting Strength and/or Weathered Parting Strength. The procedures for measuring these characteristics are set out below. This is particularly the case for low and medium density insulating products, for example, having a density in the range 5-40 kg/m$^3$, for example roll insulation and/or glass wool thermal insulation for lofts and/or cavity walls.

Desired characteristics for some mineral wool insulation product can be assessed by measuring Ordinary Compression Strength and/or Weathered Compression Strength. The procedures for measuring these characteristics are set out below. This is particularly for higher density insulating products, for example, insulating boards or materials adapted for use as: a fire barrier; a fire protection; cladding for a building; a ceiling tile; a roof board; thermal insulation for high temperature machinery for example, generators, ovens and industrial plant. Such products may be made of rock wool.

The pH of the binder when applied may be substantially neutral or alkaline; this may facilitate handling and avoid significant corrosion and/or environmental problems. Its pH when applied may be: greater than or equal to 7 and/or less than or equal to 10; between 7 and 10; between 8 and 10.

An important aspect of the invention is the pH of the binder in liquid form when applied to the fibres as this is the form in which the binder will have significant contact with manufacturing equipment as freshly prepared and in a wash water system. The binder may change its pH as it cures; it may become more acidic as it cures. Nevertheless, once cured, the binder has less direct contact with the manufacturing equipment. Furthermore, where the cured binder is substantially insoluble in water, which is preferably the case, there is little risk of acid contamination from the cured binder.

It is surprising that binders of this type at 15% or less by weight can confer the desired characteristics on the insulating product. This amount of binder is comparable with the binder contents commonly used with phenol formaldehyde based binders. The cured binder content may be 12% or less or 10% or less; it may be within the range of 3-8%, particularly 3.5-6% by weight. The binder content may be determined by loss on ignition. Such binder contents are particularly suitable for low and medium density products. Particularly for higher density products, the cured binder content may be in the range 0.5-5% by weight.

The binder may:
be based on a reducing sugar; and/or
be based on reductosis; and/or
be based on an aldehyde containing sugars/and/or
include at least one reaction product of a carbohydrate reactant and an amine reactant; and/or
include at least one reaction product of a reducing sugar and an amine reactant; and/or
include at least one reaction product of a carbohydrate reactant and a polycarboxylic acid ammonium salt reactant; and/or
include at least one reaction product from a Maillard reaction.

The binder may be based on a combination of a polycarboxylic acid, for example citric acid, a sugar, for example dextrose, and a source of ammonia, for example ammonia solution. It may be based on a combination of ammonium citrate and dextrose. Where the binder is based on sugars and/or citric acid and or comprises significant —OH groups, it is particularly surprising that such levels of Weathered Parting Strength can be achieved. It would have been thought that the —OH groups for example in the sugars and/or citric acid would be readily subject to hydrolysis and that the binder would consequently loose significant strength in humid and/or weathering conditions.

The binder may comprise a silicon containing compound, particularly a silane; this may be an amino-substituted compound; it may be a silyl ether; it may facilitate adherence of the binder to the mineral fibres.

The binder may comprise melanoidins; it may be a thermoset binder; it may be thermally curable.

The binder may be one of those disclosed in International patent application n° PCT/US2006/028929, the contents of which is hereby incorporated by reference.

The insulating material may be packaged or be provided in the form of a package; the package may comprise one or more mineral wool insulating products arranged and/or bound together, for example to facilitate transport; it may comprise an enveloping film, for example of a plastics material. The package may comprise or consist of a roll of insulating material or an assembly of individual slabs of insulating material.

The insulating material, particularly when it is a low or medium density product, may have
- a nominal thickness in the range 60-260 mm; and/or
- a thermal resistance R of R≧3 $m^2K/W$, preferably R≧4 $m^2K/W$ at a thickness or 200 mm; and/or
- a density in the range 5-40 $kg/m^3$, particularly 5-18 $kg/m^3$ or 7-12 $kg/m^3$, for example for low density roll products.

The insulating material, particularly when it is an insulating board or a higher density product, may have
- a nominal thickness in the range 20 to 200 mm; and/or
- a thermal resistance R of R≧1.7 $m^2K/W$, preferably R≧2 $m^2K/W$ at a thickness or 100 mm; and/or
- a density in the range 100 to 200 $kg/m^3$, particularly 130 to 190 $kg/m^3$.

The mineral fibres may be glass wool or rock wool; the fibres may have an average diameter between 2 and 9 microns or be microfibres of smaller diameter; they may have an average length between 8 and 80 mm.

The mineral fibres may be crimped.

According to a further aspect, the present invention provides a mineral fibre insulating material having at least one of the following features:
- the insulating material having cut edges;
- the insulating material having a facing provided on at least one of its major surface, for example comprising a moisture penetration barrier and/or a Kraft paper and/or an aluminium foil and/or a plastics layer and/or a laminate sheet comprising a plurality of individual layers and/or a woven or non-woven fabric; a facing may be provided on each major surface of the insulating material;
- the insulating material being a packaged insulating material held under compression for example by one or more packaging components, for example by an enveloping packaging film; the insulating material may be compressed to 80% or less of its non-compressed thickness;
- the insulating material being in the form of pipe insulation having a length of greater than 30 cm; the cross-section may be substantially annular;
- the insulating material being in the form of a compressed roll of material;
- the insulating material being in the form of a compressed slab of material;
- the insulating material being a roll or slab having a length of greater than or equal to 1 m, preferably greater than or equal to 2 m;
- the insulating material being a roll or slab having a width of greater than or equal to 0.3 m, preferably greater than or equal to 0.5 m;
- the insulating material having a nominal thickness of at least 45 mm, preferably at least 50 mm, and a density in the range 5-40 $kg/m^3$ The insulating material may have any combination of these features; these features may be combined with other features and/or aspects described herein.

EXAMPLES

Non-limiting examples of the invention are described below with reference to FIG. 1 which shows the form of samples used for testing parting strength.

An aqueous binder was prepared by mixing together:

|  | Approximate % by weight |
| --- | --- |
| Powdered dextrose monohydrate | 12.9% |
| Powdered anhydrous citric acid | 2.3% |
| 28% aqueous ammonia | 2.6% |
| Silane A-1100 | 0.05% |
| water | 82.1% |

This binder was used in the manufacture of a fibre glass insulating product on a standard manufacturing line, the binder being sprayed onto glass fibres just after fiberising using internal spinners and the coated fibres being collected, assembled in to a mat and cured in the usual way.

The binder had a pH of about 8 when applied to the glass fibres.

The cured glass fibre insulating product had:
- a binder content of about 5% by weight as determined by loss on ignition
- a thickness of about 150 mm
- a density of about 9 $kg/m^3$ This is suitable as a low density residential roll insulation product; it was packaged in a roll under compression.

Desired characteristics and results achieved are set out in Table 1:

TABLE 1

|  | Units | Acceptance limit | Preferred | More Preferred | Most preferred | Result achieved |
| --- | --- | --- | --- | --- | --- | --- |
| Recovered Thickness | % of nominal | ≧95 | ≧100 | ≧110 | ≧120 | 103 |
| Ordinary Parting Strength | g/g | ≧95 | ≧100 | ≧150 | ≧200 | 122 |
| Weathered Parting strength | g/g | ≧75 | ≧80 | ≧100 | ≧150 | 112 |

Testing of Recovered Thickness:

Recovered Thickness is tested and measured in accordance with Annex A of British standard BS EN 823: 1995 (incorporated herein by reference) and expressed as a % of the nominal or announced thickness for the product measured.

Testing of Ordinary Parting Strength and Weathered Parting Strength:

Parting strength is a measure of the tensile strength of mineral fibre mats determined by placing an O shaped sample over cylindrical jaws, separating the jaws and measuring the load to break the fibres. Although it can be measured in Newtons per gram, the parting strength is expressed in grams/gram being the total breaking load of six test specimens divided by their total weight.

The test is carried out on mineral fibre mats as received for testing (Ordinary Parting Strength) and after an accelerated weathering test as explained below (Weathered Parting Strength).

A first set of six samples of the form and dimensions shown in FIG. 1 are cut from the mineral fibre mat to be tested; the long axis of the samples should be parallel to the conveyor direction and the samples should be taken across the full width of the mineral mat. A second set of six samples is then taken in the same way. The dimensions in FIG. 1 are in mm.

The total weight of the first group of six samples W1 in grams is recorded.

The total weight of the second group of six samples W2 in grams is recorded; these samples are then placed in a preheated autoclave and conditioned on a wire mesh shelf away from the bottom of the chamber under wet steam at 35 kN/m² for one hour. They are then removed, dried in an oven at 100° C. for five minutes and tested immediately for parting strength.

To test the parting strength, each sample is mounted in turn on the jaws of the tensile strength machine and the maximum breaking load in grams or Newtons is recorded. If the breaking load is measured in Newtons it is converted to grams by multiplying it by 101.9. Six results in grams are obtained for each set of samples: G1 G2 G3 G4 G5 and G6 for the first set of samples and G7 G8 G9 G10 G11 and G12 for the second set of samples.

The Ordinary Parting Strength is calculated from the first set of samples using the formula Ordinary Parting Strength=(G1+G2+G3+G4+G5+G6)/W1.

The Weathered Parting Strength is calculated from the second set of samples using the formula Weathered Parting Strength=(G7+G8+G9+G10+G11+G12)/W2.

In another example, an aqueous binder was prepared by mixing together:

| | Approximate % by weight |
|---|---|
| Powdered dextrose monohydrate | 19.1% |
| Powdered anhydrous citric acid | 3.4% |
| 28% aqueous ammonia | 2.6% |
| Silane A-1100 | 0.07% |
| Water | 73.5% |

This binder was used in the manufacture of a rock wool roof board on a standard manufacturing line, the binder being sprayed onto the fibres just after fiberising and the coated fibres being collected, assembled in to a mat, compressed and cured in the usual way.

The cured roof board had:
a binder content of about 3% by weight as determined by loss on ignition
a thickness of about 80 mm
a density of about 150 kg/m³
It was packaged as part of a stack of insulation boards.
Desired characteristics and results achieved are set out in Table 2:

TABLE 2

| | Units | Acceptance limit | Preferred | More Preferred | Most preferred | Result achieved |
|---|---|---|---|---|---|---|
| Ordinary Compression Strength | kPa | ≧60 | ≧70 | ≧80 | ≧90 | 72.3 |
| Weathered Compression Strength | kPa | ≧25 | ≧30 | ≧40 | ≧50 | 54.6 |

Testing of Ordinary Compression Strength and Weathered Compression Strength:

Ordinary Compression Strength is measured according to British Standard BS EN 826: 1996 (incorporated herein by reference).

Weathered Compression Strength is measured according to British Standard BS EN 826: 1996 on samples that have been subjected to the following accelerated weathering procedure: samples are cut to size and then placed in a preheated autoclave and conditioned on a wire mesh shelf away from the bottom of the chamber under wet steam at 35 kN/m² for one hour. They are then removed, dried in an oven at 100° C. for five minutes and tested immediately for compression strength.

In both cases, compression strength is determined in the direction of the thickness of the product; the dimensions of face of the samples in contact with the compression test apparatus are preferably 200 mm×200 mm.

What is claimed is:

1. A mineral fiber insulating material comprising mineral fibers and less than about 15% by weight of an organic binder, wherein
   a) the organic binder is a formaldehyde free product of curing an aqueous solution having a pH of greater than 5 when applied to the mineral fibers,
   b) the mineral fiber insulating material has a recovered thickness of at least about 95% as determined according to Annex A of British standard BS EN 823: 1995,
   c) the mineral fiber insulating material having an ordinary parting strength of at least about 95 g/g,
   d) the mineral fiber insulating material having a weathered parting strength of at least about 75 g/g, and
   e) the mineral fiber insulating material is packaged.

2. The mineral fiber insulating material of claim 1, wherein the recovered thickness is at least about 100%.

3. The mineral fiber insulating material of claim 1, wherein the ordinary parting strength is at least about 100 g/g.

4. The mineral fiber insulating material of claim 1, wherein the weathered parting strength is at least about 80 g/g.

5. The mineral fiber insulating material of claim 1, wherein the mineral fiber insulating material is a rolled product having a density between about 5 and about 40 kg/m³ and the mineral fiber insulating material is packaged under compression.

6. The mineral fiber insulating material of claim 1, wherein the organic, formaldehyde free binder is the product of drying and curing the aqueous solution with the pH being less than about 11 when applied to the mineral fibers.

7. The mineral fiber insulating material of claim 6, wherein the organic, formaldehyde free binder is the product of drying and curing the aqueous solution with the pH being between about 6 and about 10 when applied to the mineral fibers.

8. The mineral fiber insulating material of claim 1, wherein the organic, formaldehyde free binder is between about 2% and about 8% of the mineral fiber insulating material by weight.

9. The mineral fiber insulating material of claim 1, wherein the organic, formaldehyde free binder comprises a product of a reaction including a reducing sugar.

10. The mineral fiber insulating material of claim 1, wherein the organic, formaldehyde free binder comprises at least one Maillard reaction product.

11. A mineral fiber insulating material having a density in a range of 100 to 200 kg/m$^3$ comprising mineral fibers and less than 15% by weight an organic, formaldehyde free binder, wherein
 a) the mineral fiber insulating material has an ordinary compression strength of at least about 60 kPa,
 b) the mineral fiber insulating material has a weathered compression strength of at least about 25 kPa,
 c) the organic, formaldehyde free binder is a product of drying and curing an aqueous solution with a pH of greater than about 5 when applied to the mineral fibers, and
 d) the mineral fiber insulating material is packaged.

12. The mineral fiber insulating material of claim 11, wherein the ordinary compression strength is at least about 70 kPa.

13. The mineral fiber insulating material of claim 11, wherein the weathered compression strength is at least about 30 kPa.

14. The mineral fiber insulating material of claim 11, wherein the organic, formaldehyde free binder is the product of drying and curing the aqueous solution with the pH being less than about 11 when applied to the mineral fibers.

15. The mineral fiber insulating material of claim 11, wherein the organic, formaldehyde free binder is the product of drying and curing the aqueous solution with the pH being between about 6 and about 10 when applied to the mineral fibers.

16. The mineral fiber insulating material of claim 11, wherein the organic, formaldehyde free binder is between about 2% and about 8% of the mineral fiber insulating material by weight.

17. The mineral fiber insulating material of claim 11, wherein the organic, formaldehyde free binder comprises a product of a reaction including a reducing sugar.

18. The mineral fiber insulating material of claim 11, wherein the organic, formaldehyde free binder comprises at least one Maillard reaction product.

19. The mineral fiber insulating material of claim 11, wherein the aqueous solution further comprises citric acid, ammonia and dextrose.

20. A method of manufacturing a packaged mineral fibre insulating material selected from the group consisting of:
 (i) material having
  a) a Recovered Thickness of at least 95%; and
  b) an Ordinary Parting Strength of at least 95 g/g; and
  c) a Weathered Parting Strength of at least 75 g/g; and
 (ii) material having
  a) an Ordinary Compression Strength of at least 60 kPa; and
  b) a Weathered Compression Strength of at least 25 kPa;
comprising the steps of
 i) applying an organic, formaldehyde free binder in aqueous solution to the mineral fibres at a pH of greater than 5 and
 ii) curing the product so that it contains a quantity of less than 15% by weight of binder and
 iii) packaging the insulating material.

* * * * *